United States Patent [19]

Anderson

[11] 3,852,448
[45] Dec. 3, 1974

[54] N-SUBSTITUTED AMINO-N-NITROSO-AMINOACETONITRILES FOR TREATING HYPERTENSION

[75] Inventor: Paul L. Anderson, Dover, N.J.

[73] Assignee: Sandoz-Wander, Inc., Hanover, N.J.

[22] Filed: Aug. 22, 1973

[21] Appl. No.: 390,531

Related U.S. Application Data

[60] Division of Ser. Nos. 326,405, Feb. 4, 1971, Pat. No. 3,780,180, which is a continuation-in-part of Ser. No. 41,056, May 27, 1970, abandoned.

[52] U.S. Cl.................. 424/250, 424/244, 424/248, 424/258, 424/267, 424/304
[51] Int. Cl............................................. A61k 27/00
[58] Field of Search..................................... 424/250

[56] References Cited
OTHER PUBLICATIONS

Derwent No. 30749, abstracting Netherlands 67/0945 (Feb. 12, 1968).

*Primary Examiner*—Stanley J. Friedman
*Attorney, Agent, or Firm*—Gerald D. Sharkin; Robert S. Honor

[57] ABSTRACT

Certain known N-substituted amino-N-nitroso-aminoacetonitriles, e.g., N-morpholino-N-nitroso-aminoacetonitrile, have been found to be useful as hypotensive/anti-hypertensive agents.

2 Claims, No Drawings

N-SUBSTITUTED AMINO-N-NITROSO-AMINOACETONITRILES FOR TREATING HYPERTENSION

This is a divisional of copending application Ser. No. 326,405 filed Feb. 4, 1971 now U.S. Pat. No. 3,780,180, which in turn is a continuation-in-part of patent application Ser. No. 41,056, filed May 27, 1970, now abandoned.

This invention relates to N-nitroso-aminoacetonitrile derivatives. More particularly, this invention concerns the use of N-substituted amino-N-nitroso-aminoacetonitriles as hypotensive/anti-hypertensive agents and to pharmaceutical compositions containing the above compounds as an active ingredient thereof.

The active agents with which this invention is concerned may be represented by the following structural formula

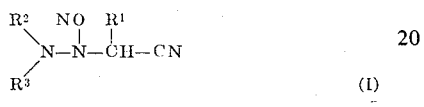

(I)

where

R$^1$ represents hydrogen, alkyl or

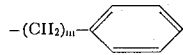

where m is 0, 1 or 2; and

R$^2$ and R$^3$ each, independently, represent lower alkyl, i.e., alkyl having 1 to 4 carbon atoms, e.g., methyl, ethyl, n-propyl and the like; lower alkenyl, i.e., alkenyl having 3 to 5 carbon atoms, e.g., allyl, and the like; lower alkynyl, i.e., alkynyl having 3 to 5 carbon atoms; e.g., propargyl and the like; ω-hydroxyloweralkyl, i.e., ω-hydroxyloweralkyl having 2 to 4 carbon atoms, e.g., β-hydroxyethyl and the like; cycloalkyl having 3 to 8 carbon atoms, e.g., cyclohexyl and the like;

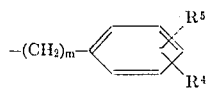

R$^4$ and R$^5$ each, independently, represent hydrogen; hydroxy; halo having an atomic weight of about 19 to 36; cyano trifluoromethyl; lower alkyl as defined above; lower alkoxy i.e., alkoxy having 1 to 4 carbon atoms, e.g., methoxy, ethoxy, and the like; alkanoyloxy having 2 to 4 carbon atoms, e.g., acetoxy and the like; alkanoyl having 2 to 4 carbon atoms, e.g., acetyl and the like; ω-hydroxy-lower alkyl, i.e., ω-hydroxy-lower alkyl having 2 to 4 carbon atoms, e.g., β-hydroxyethyl and the like; di-lower alkyl amino, i.e., di-lower alkyl amino wherein the lower alkyl is as defined above, e.g., dimethylamino, diethylamino and the like; or R$^4$ and R$^5$ together on adjacent atoms may be —CH$_2$OCH$_2$— or —OCH$_2$O—; or R$^2$ and R$^3$ together with N represent

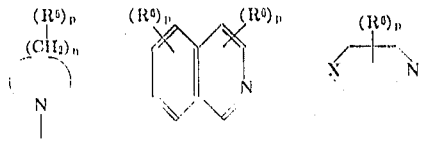

where n is 4, 5 or 6;

p is 0, 1 or 2;

X represents —O— or

where

R$^7$ is hydrogen; lower alkyl as defined above; alkanoyl having 2 to 4 carbon atoms; ω-hydroxy lower alkyl as defined above; alkoxyalkyl having 2 to 4 carbon atoms, e.g., methoxyethyl and the like; lower alkyl having 1 to 4 carbon atoms substituted with 1 to 4 halogen atoms having an atomic weight between 19 to 36, e.g., trifluoromethyl and the like or

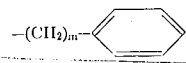

where m is as defined above; and

R$^6$ represents hydroxy; halo as defined above; lower alkyl, as defined above; lower alkoxy, as defined above, alkanoyl having 2 to 4 carbon atoms; alkanoyloxy having 2 to 4 carbon atoms; ω-hydroxy lower alkyl, as defined above, alkoxyalkyl having 2 to 4 carbon atoms, e.g., methoxyethyl and the like; lower alkyl having 1 to 4 carbon atoms substituted with 1 to 4 halogens having an atomic weight between about 19 to 36, e.g., trifluoromethyl, α,β-dichloroethyl and the like; or

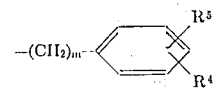

where m is as defined above, provided that when R$^4$ and R$^5$ are both trifluoromethyl or when more than one of R$^6$ is trifluoromethyl on a phenyl ring, they are on other than adjacent carbon atoms.

The compounds of formula (I) are known and may be prepared according to methods disclosed in the literature from known materials. The present invention contemplates only the novel use of such compounds, particularly as hypotensive/anti-hypertensive agents. The preferred compound for this use is N-morpholino-N-nitroso-aminoacetonitrile.

Other N-disubstituted amino-N-nitroso-aminoacetonitriles which can be used in the pharmaceutical compositions of this invention include N-diallylamino-N-nitroso-aminoacetonitrile
N-dimethylamino-N-nitroso-aminoacetonitrile
N-diallylamino-N-nitroso-α-phenethyl-aminoacetonitrile
N-diallylamino-N-nitroso-α-methyl-aminoacetonitrile
N-methylpropargylamino-N-nitroso-aminoacetonitrile
N-(N-allyl-β-hydroxyethylamino)-N-nitroso-aminoacetonitrile
N-methylcyclohexylamino-N-nitroso-aminoacetonitrile
N-methylphenylamino-N-nitroso-aminoacetonitrile N-methylphenylethylamino-N-nitroso-aminoacetonitrile
N-dibenzylamino-N-nitroso-aminoacetonitrile
N-(N-methyl-p-hydroxyphenylamino)-N-nitroso-aminoacetonitrile
N-(N-propyl-p-chlorophenylamino)-N-nitroso-aminoacetonitrile
N-(N-methyl-p-cyanophenylamino)-N-nitroso-α-phenyl-aminoacetonitrile
N-(N-ethyl-o-trifluoromethylphenylamino)-N-nitroso-aminoacetonitrile
N-(N-methyl-o-methoxyphenylamino)-N-nitroso-aminoacetonitrile
N-(N-methyl-o-toluidino)-N-nitroso-aminoacetonitrile
N-(N-methyl-p-acetoxyphenylamino)-N-nitroso-aminoacetonitrile
N-(N-methyl-p-acetylphenylamino)-N-nitroso-aminoacetonitrile
N-(N-methyl-o-[β-hydroxyethyl]phenylamino)-N-nitroso-aminoacetonitrile
N-(N-methyl-p-dimethylaminophenylamino)-N-nitroso-aminoacetonitrile
N-(N-methyl-3,4-dimethyleneoxyphenylamino)-N-nitroso-aminoacetonitrile and
N-(N-methyl-3,4-methylenedioxybenzylamino)-N-nitroso-aminoacetonitrile The N-heterocyclic substituted-N-nitroso-aminoacetonitriles contemplated as active agents in the compositions of this invention include
N-piperidino-N-nitroso-aminoacetonitrile
N-piperidino-N-nitroso-α-methyl-aminoacetonitrile
N-hexamethyleneimino-N-nitroso-aminoacetonitrile N-(4-hydroxypiperidino)-N-nitroso-aminoacetonitrile
N-(2,4-dichloropiperidino)-N-nitroso-aminoacetonitrile
N-(4-methylpiperidino)-N-nitroso-aminoacetonitrile
N-(4-methoxypiperidino)-N-nitroso-aminoactonitrile
N-(4-actylpiperidino)-N-nitroso-aminoacetonitrile
N-(4-acetoxypiperidino)-N-nitroso-aminoacetonitrile
N-(4-[β-hydroxyethyl]-piperidino)-N-nitroso-aminoacetonitrile
N-(4-methoxyethylpiperidino)-N-nitroso-aminoacetonitrile
N-(4-trifluoromethylpiperidino)-N-nitroso-aminoacetonitrile
N-(2-benzylpiperidino)-N-nitroso-aminoacetonitrile
N-(2-phenylpiperidino)-N-nitroso-aminoacetonitrile N-isoquinolino-N-nitroso-aminoacetonitrile
N-[1-hydroxyisoquinolino]-N-nitroso-aminoacetonitrile
N-[1-chloroisoquinolino]-N-nitroso-aminoacetonitrile
N-[1-methylisoquinolino]-N-nitroso-aminoacetonitrile
N-[1-methoxyisoquinolino]-N-nitroso-aminoacetonitrile
N-[1-acetylisoquinolino]-N-nitroso-aminoacetonitrile
N-[1-acetoxyisoquinolino]-N-nitroso-aminoacetontrile
N-[1-β-hydroxyethylisoquinolino]-N-nitroso-aminoacetonitrile
N-[1-methoxyethylisoquinolino]-N-nitroso-aminoacetonitrile
N-[4-trifluoromethylisoquinolino]-N-nitroso-aminoacetonitrile
N-[1-benzylisoquinolino]-N-nitroso-aminoacetonitrile
N-(2-hydroxymorpholino)-N-nitroso-aminoacetonitrile
N-(2-chloromorpholino)-N-nitroso-aminoacetonitrile
N-(2-methylmorpholino)-N-nitroso-aminoacetonitrile
N-(2-methoxymorpholino)-N-nitroso-aminoacetonitirle
N-(2-acetylmorpholino)-N-nitro-aminoacetonitrile
N-(2-acetoxymorpholino)-N-nitroso-aminoacetonitrile
N-(3-β-hydroxyethylmorpholino)-N-nitroso-aminoacetonitrile
N-(3-methoxyethylmorpholino)-N-nitroso-aminoacetonitrile
N-(3-trifluoromethylmorpholino)-N-nitroso-aminoacetonitrile
N-(3-benzylmorpholino)-N-nitroso-aminoacetonitrile
N-piperazino-N-nitroso-aminoacetonitrile
N-[2-hydroxypiperazino]-N-nitroso-aminoacetonitrile
N-[2-chloro-4-methylpiperazino]-N-nitroso-aminoacetonitrile
N-[2-methyl-4-acetylpiperazino]-N-nitroso-aminoacetonitrile
N-[2-methoxypiperazino]-N-nitroso-aminoacetonitrile
N-[2-acetylpiperazino]-N-nitroso-aminoacetonitrile
N-[2-acetoxypiperazino]-N-nitroso-aminoacetonitrile
N-[2-β-hydroxyethylpiperazino]-N-nitroso-aminoacetonitrile
N-[2-methoxyethylpiperazino]-N-nitroso-aminoacetonitrile
N-[3-trifluoromethylpiperazino]-N-nitroso-aminoacetonitrile
N-[3-benzylpiperazino]-N-nitroso-aminoacetonitrile N-[4-β-hydroxyethylpiperazino]-N-nitroso-aminoacetonitrile
N-[4-methoxyethylpiperazino]-N-nitroso-aminoacetonitrile
N-[4-trifluoromethylpiperazino]-N-nitroso-aminoacetonitrile
N-[4-benzylpiperazino]-N-nitroso-aminoacetonitrile or
N-[4-β-hydroxyethylpiperazino]-N-nitroso-α-methyl-aminoacetonitrile.

As previously indicated, the compounds of formula (I) are useful because they possess pharmacological acitivity in animals. In particular, they are useful as hypotensive/anti-hypertensive agents as indicated by their activity in renal hypertensive rat given 30 mg/kg of active compound using the technique of A. Grollman (Proc. Soc. Exptl. Biol. and Med. 57:102, 1944) and indirectly measuring the blood pressure from the caudal artery in the tail using a pneumatic pulse transducer. For such usage, compound (I) may be administered orally or parenterally as such or admixed with conventional pharmaceutical carriers. They may be administered orally in such forms as tablets, dispersible powders, granules, capsules, syrups and elixirs, and parenterally as solutions, suspensions, dispersions, emulsions, and the like, e.g., a sterile injectable aqueous suspension. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned above. The pharmaceutical preparations may contain up to about 90 percent of the active ingredient in combination with the carrier or adjuvant.

The anit-hypertensive effective dosage of active ingredient employed for the treatment of hypertension may vary depending on the particular compound employed and the severity of the condition being treated. However, in general, satisfactory results are obtained when the compounds (I) are administered at a daily dosage of from about 0.1 milligram to about 50 milligrams per kilogram of animal body weight, preferably given in divided doses 2 to 4 times a day, or in sustained release form. For most large mammals in need of said treatment, the total daily dosage is from about 7 to about 200 milligrams. Dosage forms suitable for internal use comprise from about 1.75 to about 100 milligrams of the active compound in intimate admixture with a solid or liquid pharmaceutically acceptable carrier or diluent.

The preferred pharmeceutical compositions from the standpoint of preparation and ease of administration are solid compositions, particularly hard-filled capsules and tablets containing about 25 to 100 milligrams of active ingredient.

EXAMPLE 1

Tablets

Tablets suitable for oral administration which contain the following ingredients may be prepared by conventional tabletting techniques. Such tablets are useful in treating hypertension at a dose of one tablet 2 to 4 times a day.

| Ingredient | Weight (mg) |
|---|---|
| N-morpholino-N-nitroso-aminoacetonitrile | 50 |
| Tragacanth | 10 |
| Lactose | 197.5 |
| Corn Starch | 25 |
| Talcum | 15 |
| Magnesium Stearate | 2.5 |

EXAMPLE 2

Dry Filled Capsules

Capsules suitable for oral administration which contain the following ingredients are prepared in a conventional manner. Such capsules are useful in treating hypertension at a dose of one capsule 2 to 4 times a day.

| Ingredient | Weight (mg) |
|---|---|
| N-morpholino-N-nitroso-aminoacetonitrile | 50 |
| Inert solid diluent (starch, lactose, kaolin) | 250 |

EXAMPLE 3

Sterile Solution for Injection

The following ingredients are dissolved in water for injection. The resulting solution is filtered through an appropriate medium to render a clear solution. The solution is then autoclaved to render it sterile.

| Ingredient | Weight (%) |
|---|---|
| N-morpholino-N-nitroso-aminoacetonitrile | 10 |
| Sodium alginate | 0.5 |
| Buffer system | As desired |
| Lecithin | 0.5 |
| Sodium chloride | As desired |
| Water for injection | To desired volume |

EXAMPLE 4

The following formulations for syrups or elixirs containing an effective amount of active compound may be formulated using conventional methods.

| | Percent by Weight | |
|---|---|---|
| | syrup | elixir |
| N-morpholino-N-nitroso-aminoacetonitrile | .5–3.5 | .5–3.5 |
| Buffering system | quantity | sufficient to adjust pH |
| Sodium benzoate | .1–.5 | .1–.5 |
| Flavoring agent | .01–.2 | .01–.2 |
| Water | 20–40 | 5–20 |
| Simple syrup U.S.P. | 30–70 | 0 |
| Sorbitol solution (70%) | 10–30 | 20–60 |
| Certified Dye | .5–2 | .5–2 |
| Alcohol | 0 | 2.5–20 |
| Methyl paraben | 0 | .05–.1 |
| Propyl paraben | 0 | .05–.1 |
| Sodium saccharin | 0 | .01–.08 |

EXAMPLES 5 and 6

Tablets and Capsules Suitable For Oral Administration

Tablets and capsules containing the ingredients indicated below may be prepared by conventional techniques and are useful in treating hypertension at a dose of one tablet or capsule 2 to 4 times a day.

| Ingredient | | Weight (mg) | |
|---|---|---|---|
| | | tablet | capsule |
| N-(2-chloromorpholino)-N-nitroso-aminoacetonitrile | | 50 | 50 |
| tragacanth | | 10 | — |
| lactose | | 197.5 | 250 |
| corn starch | | 25 | |
| talcum | | 15 | |
| magnesium stearate | | 2.5 | |
| | Total | 300 mg. | 300 mg |

Similarly, tablets and capsules are prepared using N-(2-hydroxymorpholino)-N-nitroso-aminoacetonitrile; N-(2-methylmorpholino)-N-nitroso-aminoacetonitrile; N-(2-methoxymorpholino)-N-nitroso-aminoacetonitrile; N-(2-acetylmorpholino)-N-nitroso-aminoacetonitrile or N-(2-acetoxymorpholino)-N-nitroso-aminoacetonitrile in place of the N-(2-chloromorpholino)-N-nitroso-aminoacetonitrile above and are used as above in treating hypertension.

EXAMPLE 7 and 8

Sterile Suspension for Injection and Oral Liquid Suspension

The following pharmaceutical compositions are formulated with the indicated amount of active agent using conventional techniques. The injectable suspension and the oral liquid suspension represent formulations useful as unit doses and may be administered in the treatment of hypertension. The injectable suspension is suitable for administration once or twice a day whereas the oral liquid suspension is suitably administered 2 to 4 times per day for this purpose.

| Ingredients | Weight (mg) sterile injectable suspension | oral liquid suspension |
|---|---|---|
| N-(2-hydroxymorpholino)-N-nitroso-aminoacetonitrile | 50 | 50 |
| sodium carboxy methyl cellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s. |
| methyl paraben, U.S.P. | — | 4.5 |
| propyl paraben, U.S.P. | — | 1.0 |
| polysorbate 80 (e.g. Tween 80), U.S.P. | — | 5 |
| sorbitol solution, 70%, U.S.P. | — | 5 |
| buffer agent to adjust pH for desired stability | q.s. | q.s. |
| water | for injection, q.s. to 1 ml. | q.s. to 5 ml. |

Injectable suspension and oral liquid suspensions are similarly prepared using N-(2-(chloromorpholino)-N-nitroso-aminoacetonitrile; N-(2-methylmorpholino)-N-nitroso-aminoacetonitrile; N-(3-β-hydroxymethylmorpholino)-N-nitroso-aminoacetonitrile; N-(3-methoxymethylmorpholino)-N-nitroso-aminoacetonitrile; N-(3-trifluoromethylmorpholino)-N-nitroso-aminoacetonitrile or N-(3-benzylmorpholino)-N-nitroso-aminoacetonitrile in place of the N-(2-hydroxymorpholino)-N-nitroso-aminoacetonitrile above and are used as above in treating hypertension.

EXAMPLES 9 and 10

Tablets and Capsules Suitable For Oral Administration

Tablets and capsules containing the ingredients indicated below may be prepared by conventional techniques and are useful in treating hypertension at a dose of one tablet or capsule 2 to 4 times a day.

| Ingredient | | Weight (mg) | |
|---|---|---|---|
| | | tablet | capsule |
| N-diallylamino-N-nitroso-aminoacetonitrile | | 50 | 50 |
| tragacanth | | 10 | — |
| lactose | | 197.5 | 250 |
| corn starch | | 25 | |
| talcum | | 15 | |
| magnesium stearate | | 2.5 | |
| | Total | 300 mg. | 300 mg. |

Tablets and capsules are similarly prepared using N-dimethylamino-N-nitroso-aminoacetonitrile; N-diallylamino-N-nitroso-α-phenethyl-aminoacetonitrile; N-diallylamino-N-nitroso-α-methyl-aminoacetonitrile; N-methylpropylamino-N-nitroso-aminoacetonitrile; N-(N-allyl-p-hydroxymethylamino)-N-nitroso-aminoacetonitrile; or N-methylcyclohexylamino-N-nitroso-aminoacetonitrile in place of the N-N-diallylamino-N-nitroso-aminoacetonitrile above and are used as above in treating hypertension.

EXAMPLES 11 and 12

Tablets and Capsules Suitable For Oral Administration

Tablets and capsules containing the ingredients indicated below may be prepared by conventional techniques and are useful in treating hypertension at a dose of one tablet or capsule 2 to 4 times a day.

| Ingredient | Weight (mg) | |
|---|---|---|
| | tablet | capsule |
| N-methylphenylamino-N-nitroso-aminoacetonitrile | 50 | 50 |
| tragacanth | 10 | |
| lactose | 197.5 | 250 |
| corn starch | 25 | |
| talcum | 15 | |
| magnesium stearate | 2.5 | |
| Total | 300 mg. | 300 mg. |

Similarly tablets and capsules are prepared using N-methylphenethylamino-N-nitroso-aminoacetonitrile; N-dibenzylamino-N-nitroso-aminoacetonitrile; N-(N-methyl-p-hydroxyphenylamino)-N-nitroso-aminoacetonitrile; N-(N-propyl-p-chlorophenylamino)-N-nitroso-aminoacetonitrile; N-(N-methyl-p-cyanophenylamino)-N-nitroso-aminoacetonitrile; N-(N-ethyl-o-trifluoromethylphenylamino)-N-nitroso-aminoacetonitrile; N-(N-methyl-o-methoxyphenylamino)-N-nitroso-aminoacetonitrile or N-(N-methyl-o-toluidino)-N-nitroso-aminoacetonitrile in place of the N-methylphenylamino-N-nitroso-aminoacetonitrile above and are used as above in treating hypertension.

EXAMPLES 13 and 14

Sterile Suspension for Injection and Oral Liquid Suspension

The following pharmaceutical compositions are formulated with the indicated amount of active agent using conventional techniques. The injectable suspension and the oral liquid suspension represent formulations useful as unit doses and may be administered in the treatment of hypertension. The injectable suspension is suitable for administration once a day whereas the oral liquid suspension is suitably administered 2 to 4 times per day for this purpose.

| Ingredients | Weight (mg) | |
|---|---|---|
| | sterile injectable suspension | oral liquid suspension |
| N-(N-methyl-o-toluidino)-N-nitroso-aminoacetonitrile | 50 | 50 |
| sodium carboxy methyl cellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s. |
| methyl paraben, U.S.P. | — | 4.5 |
| propyl paraben, U.S.P. | — | 1.0 |
| polysorbate 80 (e.g. Tween 80), U.S.P. | — | 5 |
| sorbitol solution, 70%, U.S.P. | — | 2,500 |
| buffer agent to adjust pH for desired stability | q.s. | q.s. |
| water | for injection, q.s. to 1 ml. | q.s. to 5 ml. |

Sterile injectable suspensions and oral liquid suspensions are similarly prepared using N-(N-methyl-1-acetoxyphenylamino)-N-nitroso-aminoacetonitrile; N-N-methyl-p-actylphenylamino)-N-nitroso-aminoacetonitrile; N-(n-methyl-o-[β-hydroxyethyl]phenylamino-N-nitroso-aminoacetonitrile; N-(N-methyl-p-dimethylaminophenylamino)-N-nitroso-aminoacetonitrile; N-(N-methyl-3,4-dimethyleneoxyphenylamino)-N-nitroso-aminoacetonitrile; or N-(N-methyl-3,4-methylenedioxybenzylamino)-N-nitroso-aminoacetontrile in place of the N-(N-methyl-o-toluidino)-N-nitrosoaminoacetonitrile above and are used as above in treating hypertension.

EXAMPLES 15 and 16

Tablets and Capsules Suitable For Oral Administration

Tablets and capsules containing the ingredients indicated below may be prepared by conventional techniques and are useful in treating hypertension at a dose of one tablet or capsule 2 to 4 times a day.

| Ingredient | Weight (mg) | |
|---|---|---|
| | tablet | capsule |
| N-piperidino-N-nitroso-aminoacetonitrile | 50 | 50 |
| tragacanth | 10 | — |
| lactose | 197.5 | 250 |
| corn starch | 25 | |
| talcum | 15 | |
| magnesium stearate | 2.5 | |
| Total | 300 mg. | 300 mg. |

Similarly, tablets and capsules are prepared using N-piperidino-N-nitroso-α-methyl-aminoacetonitrile; N-hexyleneimino-N-nitroso-aminoacetonitrile; N-(4-hydroxypiperidino)-N-nitroso-aminoacetonitrile; N-(2,4-dichloropiperidino)-N-nitroso-aminoacetonitrile; N-(4-methylpiperidino)-N-nitroso-aminoacetonitrile; N-(4-methoxypiperidino)-N-nitroso-aminoacetonitrile; N-(4-acetylpiperidino)-N-nitroso-aminoacetonitrile; or N-(4-acetoxypiperidino)-N-nitroso-aminoacetonitrile, in place of the N-piperazino-N-nitroso-aminoacetonitrile above and are used as above in treating hypertension.

EXAMPLES 17 and 18

Sterile Suspension for Injection and Oral Liquid Suspension

The following pharmaceutical compositions are formulated with the indicated amount of active agent using conventional techniques. The injectable suspension and the oral liquid suspension represent formulations useful as unit doses and may be administered in the treatment of hypertension. The injectable suspension is suitable for administration once a day whereas the oral liquid suspension is suitably administered 2 to 4 times per day for this purpose.

| sterile Ingredients | Weight (mg) sterile injectable suspension | oral liquid suspension |
|---|---|---|
| N-(4-[β-hydroxyethyl]piperazino)-N-nitroso aminoacetonitrile | 50 | 50 |
| sodium carboxy methyl cellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s. |
| methyl paraben, U.S.P. | — | 4.5 |
| propyl paraben, U.S.P. | — | 1.0 |
| polysorbate 80 (e.g. Tween 80), U.S.P. | — | 5 |
| sorbitol solution, 70%, U.S.P. | — | 2,500 |
| buffer agent to adjust pH for desired stability | q.s. | q.s. |
| water | for injection, q.s. to 1 ml. | q.s. to 5 ml. |

Sterile injectable suspensions and oral liquid suspensions similarly are prepared using N-(4-[β-hydroxyethyl]piperidino)-N-nitroso-α-methyl aminoacetonitrile; N-(4-methoxyethylpiperidino)-N-nitroso-aminoacetonitrile; N-(4-trifluoromethylpiperidino)-N-nitroso-aminoacetonitrile; N-(2-benzylpiperidino)-N-nitroso-aminoacetonitrile or N-(2-phenylpiperidino)-N-nitroso-aminoacetonitrile in place of the N-(4-[β-hydroxyethyl]piperazino)-N-nitroso-aminoacetonitrile above and are used as above in treating hypertension.

EXAMPLES 19 and 20

Sterile Suspension for Injection and Oral Liquid Suspension

The following pharmaceutical compositions are formulated with the indicated amount of active agent using conventional techniques. The injectable suspension and the oral liquid suspension represent formulations useful as unit doses and may be administered in the treatment of hypertension. The injectable suspension is suitable for administration once a day whereas the oral liquid suspension is suitably administered 2 to 4 times per day for this purpose.

| Ingredients | Weight (mg) sterile injectable suspension | oral liquid suspension |
|---|---|---|
| N-isoquinolino-N-nitroso-aminoacetonitrile | 50 | 50 |
| sodium carboxy methy cellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s. |
| methyl paraben, U.S.P. | — | 4.5 |
| propyl paraben, U.S.P. | — | 1.0 |
| polysorbate 80 (e.g. Tween 80), U.S.P. | — | 5 |
| sorbitol solution, 70%, U.S.P. | — | 2,500 |
| buffer agent to adjust pH for desired stability | q.s. | q.s. |
| water | for injection, q.s. to 1 ml. | q.s. to 5 ml. |

Sterile injectable suspensions and oral liquid suspensions similarly are prepared using N-(1-hydroxyisoquinolino)-N-nitroso-aminoacetonitrile; N-(1-chloroisoquinolino)-N-nitroso-aminoacetonitrile; N-(1-methylisoquinolino)-N-nitroso-aminoacetonitrile; N-(1-methoxyisoquinolino)-N-nitroso-aminoacetonitrile or N-(1-acetylisoquinolino)-N-nitroso-aminoacetonitrile in place of N-isoquinolino-N-nitroso-aminoacetonitrile above and are used as above in treating hypertension.

EXAMPLES 21 and 22

Tablets and Capsules Suitable For Oral Administration

Tablets and capsules containing the ingredients indicated below may be prepared by conventional techniques and are useful in treating hypertension at a dose of one tablet or capsule 2 to 4 times a day.

| Ingredient | Weight (mg) | |
|---|---|---|
| | tablet | capsule |
| N-(1β-hydroxyethylisoquinolino)-N- nitrosoaminoacetonitrile | 50 | 50 |
| tragacanth | 10 | — |
| lactose | 197.5 | 250 |
| corn starch | 25 | |
| talcum | 15 | |
| magnesium stearate | 2.5 | |
| Total | 300 mg. | 300 mg. |

Similarly tablets and capsules are prepared using N-(1-acetoxy-isoquinolino)-N-nitroso-aminoacetonitrile; N-(1-methoxyethylisoquinolino-N-nitroso-aminoacetonitrile; N-(4-trifluoromethylisoquinolino)-N-nitroso-aminoacetonitrile; or N-(1-benzylisoquinolino)-N-nitroso-aminoacetonitrile as the active ingredient in place of the N-(1-β-hydroxyethylisoquinolino)-N-nitroso-aminoacetonitrile above and are used as above in treating hypertension.

EXAMPLES 23 and 24

Sterile Suspension for Injection and Oral Liquid Suspension

The following pharmaceutical compositions are formulated with the indicated amount of active agent using conventional techniques. The injectable suspension and the oral liquid suspension represent formulations useful as unit doses and may be administered in the treatment of hypertension. The injectable suspension is suitable for administration once a day whereas the oral liquid suspension is suitable administered 2 to 4 times per day for this purpose.

EXAMPLES 25 and 26

Tablets and Capsules Suitable For Oral Administration

Tablets and capsules containing the ingredients indicated below may be prepared by conventional techniques and are useful in treating hypertension at a dose of one tablet or capsule 2 to 4 times a day.

| Ingredient | Weight (mg) | |
|---|---|---|
| | tablet | capsule |
| N-(4-β-hydroxyethylpiperazino)-N- nitrosoaminoacetonitrile | 50 | 50 |
| tragacanth | 10 | — |
| lactose | 197.5 | 250 |
| corn starch | 25 | |
| talcum | 15 | |
| magnesium stearate | 2.5 | |
| Total | 300 mg. | 300 mg. |

Similarly, tablets and capsules are prepared using N-(3-benzylpiperazino)-N-nitroso-aminoacetonitrile; N-(4-methoxyethylpiperazino)-N-nitroso-aminoacetonitrile; N-(4-trifluoromethylpiperzino)-N-nitroso-aminoacetonitrile; N-(4-benzylpiperazino)-N-nitroso-aminoacetonitrile; or N-(4-β-hydroxyethylpiperazino)-N-nitroso-α-methyl-aminoacetonitrile; N-(4-β-hydroxyethylpiperazino)-N-nitroso-α-phenyl-aminoacetonitrile in place of the N-(4-β-hydroxyethylpiperazino)-N-nitroso-aminoacetonitrile above and are used as above in treating hypertension.

| Ingredients | Weight (mg) | |
|---|---|---|
| | sterile injectable suspension | oral liquid suspension |
| N-piperazino-N-nitroso-aminoacetonitrile | 50 | 50 |
| sodium carboxy methyl cellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47..5 |
| flavor | — | q.s. |
| color | — | q.s. |
| methyl paraben, U.S.P. | — | 4.5 |
| propyl paraben, U.S.P. | — | 1.0 |
| polysorbate 80 (e.g. Tween 80), U.S.P. | — | 5 |
| sorbitol solution, 70%, U.S.P. | — | 2,500 |
| buffer agent to adjust pH for desired stability | q.s. | q.s. |
| water | for injection, q.s. to 1 ml. | q.s. to 5 ml. |

Sterile injectable suspensions and oral liquid suspensions are similarly prepared using N-(2-hydroxypiperazino)-N-nitroso-aminoacetonitrile; N-(2-chloro-4-methylpiperazino)-N-nitroso-aminoacetonitrile; N-(2-methyl-4-acetylpiperazino)-N-nitroso-aminoacetonitrile; N-(2-methoxypiperazino)-N-nitroso-aminoacetonitrile; N-(2-acetylpiperazino)-N-nitroso-aminoacetonitrile; N-(2-acetoxypiperazino)-N-nitroso-aminoacetonitrile; N-(2-β-hydroxyethylpiperazino)-N-nitroso-aminoacetonitrile; N-(2-methoxyethylpiperazino)-N-nitroso-aminoacetonitrile; or N-(3-trifluoromethylpiperazino)-N-nitroso-aminoacetonitrile as the active agent in place of N-piperazino-N-nitroso-aminoacetonitrile above and are used as above in treating hypertension.

What is claimed is:

1. A method for treating hypertension, which comprises orally or parentally administering to a mammal is need of said treatment an anti-hypertensive effective amount of a compound of the formula,

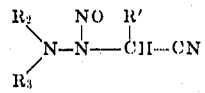

in which $R^1$ represents hydrogen, alkyl or

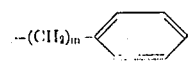

where $m$ is 0, 1 or 2 and in which $R_2$ and $R_3$ together with N represent

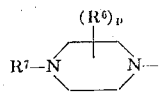

where $p$ is 0, 1 or 2, $R^6$ Represent hydroxy; halo having an atomic weight of about 19 to 36; lower alkyl; lower alkoxy; alkanoyl having 2 to 4 carbon atoms; alkanoyloxy having 2 to 4 carbon atoms; ω-hydroxy lower alkyl; alkoxyalkyl having 2 to 4 carbon atoms substituted with 1 to 4 halogen atoms having an atomic weight between about 19 to 36; or

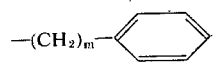

where $R^7$ is hydrogen; lower alkyl; alkanoyl having 2 to 4 carbon atoms; ω-hydroxy lower alkyl; alkoxyalkyl having 2 to 4 carbon atoms; lower alkyl having 1 to 4 carbon atoms substituted with 1 to 4 halogen atoms having an atomic weight between 19 to 36; or $-(CH_2)_m-\langle\phantom{O}\rangle$ 2. A method according to claim 1 in which the compound is N-(4-β-hydroxyethylpiperazino)-N-nitroso-α-methyl-aminoacetonitrile.

* * * * *